Dec. 26, 1967     J. R. AULD ETAL     3,359,626

PROCESS FOR JOINING GLASS-LINED METAL CONDUITS

Filed April 21, 1965

INVENTORS
JOSEPH ROBERT AULD
RICHARD B. BROWN
THOMAS T. GNIEWEK

BY *James J. Flynn*

ATTORNEY

3,359,626
PROCESS FOR JOINING GLASS-LINED METAL CONDUITS

Joseph Robert Auld, Wilmington, Richard B. Brown, Newark, Del., and Thomas T. Gniewek, Jr., Pittsburg, Calif., assignors to E. I. du Pont de Nemours and Company, Wilmington, Del., a corporation of Delaware
Filed Apr. 21, 1965, Ser. No. 449,835
4 Claims. (Cl. 29—471.1)

This invention relates to a process for joining glass-lined metal vessels, pipes or conduits. More particularly, it relates to a process for joining glass-lined metal conduits by a welding technique.

Thin walled glass-lined vessels are difficult to join simply because of their fragile nature. Glass or ceramic-lined metal vessels or pipes are quite sensitive to mechanical and thermal shock especially at conventional welding temperatures. For this reason special handling and techniques are required in their fabrication and subsequent use. It is particularly difficult to permanently and effectively join sections of pipe or larger vessels by known techniques without fracturing the glass lining, especially when high temperatures are employed.

The use of glass-lined equipment in the chemical industry has become commonplace with the development of glass coatings for metals and alloys. This equipment has become available in many shapes and sizes due to the development of techniques for coating said metal equipment which were not heretofore available. As knowledge of glass coating metals makes progress, the realization of completely lined chemical process machinery will be attained. Only recently, glass-lined transfer piping for temperatures service above 600° F. became available, which now makes it possible to interconnect large glass-lined process vessels. However, up to the time of the present invention it has been most difficult to make long runs of permanently joined glass-lined piping by joining said glass-lined conduits together. Not long after the glass-lined piping is in service cracks form on the glass surface near the weld and, consequently, the material being conducted through the pipe will leak out through these cracks or fissures, thus requiring replacement.

Figure 1:
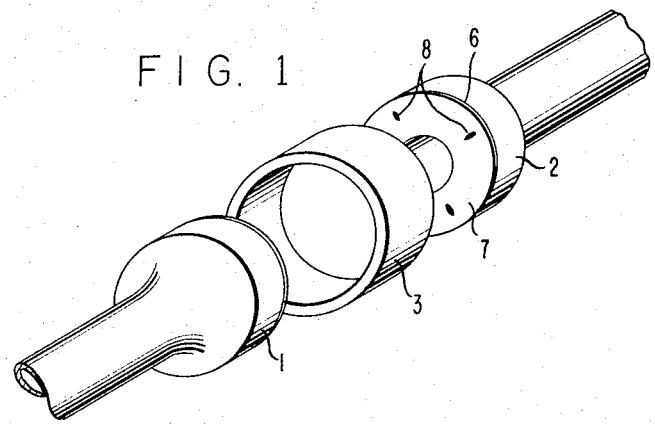
Figure 2:
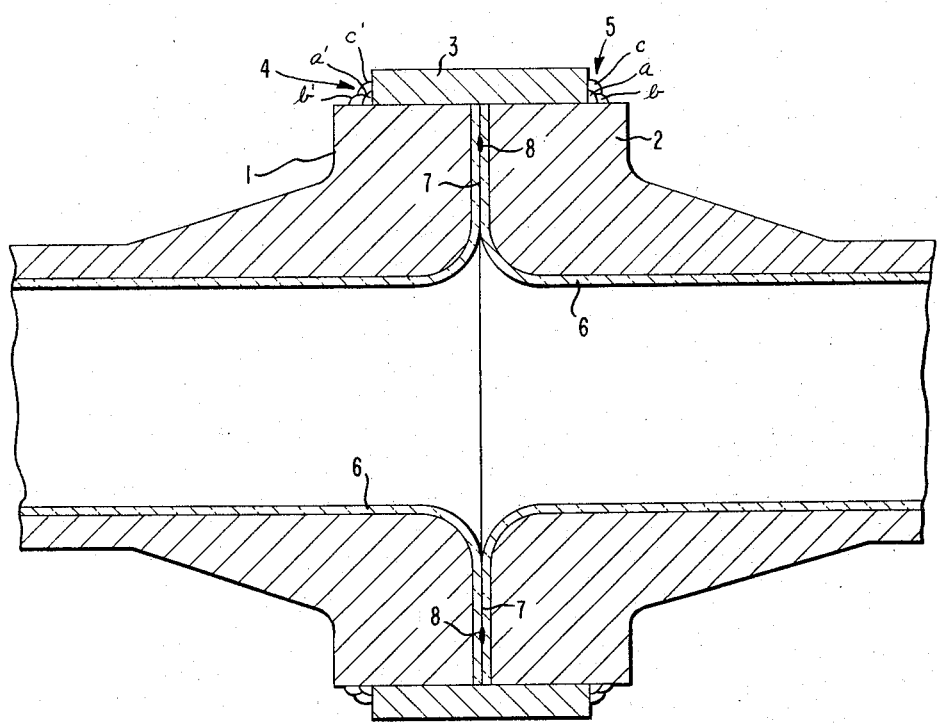

Accordingly, it is an object of this invention to provide a process for joining together glass-lined pipe or conduits without damaging said glass coating by thermal or mechanical shock. Another object of this invention is to provide a method for fabricating a continuous run of glass internally-coated metal pipe line without damaging the glass-coated surface. These and other objects of the invention will become apparent from the following detailed description and drawing wherein:

FIGURE 1 is a perspective view of two glass-lined flanged metal pipes or conduits and a retaining sleeve; and, FIGURE 2 is a cross sectional view of two glass-lined flanged metal pipes or conduits joined together in the manner described in this invention.

It has now been discovered that glass-lined metal pipe can be effectively joined together by welding without damaging the inner glass lining of the pipe provided that welding is conducted in such a manner that the temperature of the glass nearest the weld does not exceed about 400° F., and secondly, the pipe must be flanged. The process comprises aligning the flanges of glass-coated pipe in abutting relationship, positioning a retaining sleeve around the flanges or flanged rims of the pipe and welding the retaining sleeve to the pipe. The welding is conducted in such a manner that no portion of the glass-coated surface is heated above about 400° F. due to welding temperatures. Preferably, it has been found that the welding should be carried out at a temperature such that no portion of the glass-coated surface is heated above about 200° F. The temperature of the glass can be kept under 400° F. by a number of means. However, this can best be accomplished by running several weld passes to complete a fillet weld, that is to say, first welding a bead around one side of the flange on the pipe and the metal retaining sleeve, and then alternating the weld from side to side until the flanged pipe and sleeve are adequately secured. The temperature of the glass coating is recorded by means of thermocouples positioned about the flange, which is the closest point of the glass coating to the welding operation and consequently will be the hottest portion of the glass.

As shown in FIGURES 1 and 2, the process involves joining flange 1 of a glass-lined conduit with flange 2 of another conduit so that glass lining 6 becomes continuous at the junction. A metal retaining sleeve 3 is positioned over the connected flanges. The retaining sleeve is welded at position 4 and 5 in such a manner that the glass lining 6 on face 7 of the flange, which is that portion nearest the welding operation, does not become heated to a temperature greater than 400° F. and preferably within a range of from 200° F. to 400° F. during the welding operation, and more preferably, not above 200° F. Therefore, no portion of the glass lining will exceed 400 F. during the welding operation. A retaining sleeve can be rolled sheet metal or cut from a section of pipe. The thickness of the pipe or sheet should be at least that of the uncoated metal pipe. The width of the sleeve should be at least ½″ smaller than the rim thickness of the joined flanges to permit at least ¼″ for welding along each edge, however, the weld size is dictated by the temperature and pressure conditions to which the joined piping will be subjected. The internal diameter of the retaining sleeve should produce a slip fit over the flange's outer diameter.

Since the thermal conductivity varies for metals of construction it is advisable to control the temperature at the glass-coated surfaces by running several passes to complete a fillet weld as shown in FIGURE 2 at 4 and 5. By proceeding in this manner the welder can move around the flange quickly to prevent local overheating. Alternately welding beads on flange 1 and then on flange 2 permits one side to cool for a period of time prior to the addition of another pass weld. A suggested weld pass sequence is shown in FIGURE 2 at 4 and 5. The temperature at face 7 of the flanges is recorded by placing thermocouples 8 spaced about two inches apart around the flange face as shown. If local overheating of the glass occurs, as indicated by the thermocouples approaches 400° F., the process should be speeded up or stopped to permit cooling so that no portion of the glass is heated above 400° F. Once a standard technique has been worked out for a given flange size and material, welding can be carried out routinely without adding thermocouples. Retaining sleeves can be grooved to permit the thermocouple to slide under the sleeve. Thermocouples should be as thin as possible to cut down on the size of the groove necessary and when small flanges are to be welded the thermocouples can go inside the pipe. Leadwire can be welded over at the last pass around and left inside the flange.

In some instances it is desirable to insert a gasket between the glass-coated faces, and satisfactory results have been obtained as long as the gasket material is resistant to the corrosion atmosphere of the process gas and liquids that are to pass through the joined pipe. When titanium tetrachloride, for example, is circulated through the pipe the gasket material may be composed of an alumina-silica ceramic fiber, for example, "Fiberfrax" or "Kaowool." Usually welding shrinks the sleeve and gives a very tight gasket seal.

The following example illustrates a specific embodiment of the method of carrying out the process of the present invention. However, it will be understood that it is illustrative only and it is not meant to limit the invention in any manner.

Example

Nine 20 ft. lengths and eight U bends of 6″ high nickel alloy pipe were equipped with flanges but welded to each end. The overall flange diameters were 7 11/16″ with a rim thickness of 1″. Each length of pipe and flange face was internally coated by the Pfaudler Permutit Inc. (State of New York) with 1/16″ glass coating "Nucerite." These flanges were aligned and temporarily clamped together and gasketed with 6 thermocouples placed on the face of the flange, that is, between the flange surfaces. For each flange a 1 5/8″ wide retainer sleeve of 1/4″ thickness constructed of high nickel alloy was slipped over the rims and thermocouple wires. Each flange was electric-arc welded using a metal-arc process with a small coated rod of lowest heat capacity with the generator set at 45 amps using high nickel alloy rod of 3/32″ diameter. After the flange assembly was slowly preheated to about 100° F. with a gas torch to avoid thermal shock the following schedule as listed in the following table was carried out over a period of about 2 hours wherein beads were welded alternately on one side and then the other.

| Flange | Bead | Temp., F., of Glass | Remarks |
|---|---|---|---|
| 2 | a | 121 | Welding started between therocouple (T.C.) and moved toward it. |
|  |  | 121 | Stop for insertion of new rod. |
|  |  | 121 | Start again. |
|  |  | 121 | Stop for rod. |
|  |  | 121 | Start again. |
|  |  | 121 | Stop for rod. |
|  |  | 125 | Start again. |
|  |  | 191 | Stop for rod. |
|  |  | 208 | Start again. |
|  |  | 195 | Stop for rod. |
|  |  | 184 | End of Bead a on Flange 2. |
| 1 | a′ | 169 | Welding started between T.C. and moved toward it. Elapsed time between welds approx. 10 mins. |
|  |  | 169 | Stop for rod. |
|  |  | 169 | Start again. |
|  |  | 169 | Stop for rod. |
|  |  | 178 | Start again. |
|  |  | 195 | Stop for rod. |
|  |  | 208 | Start again. |
|  |  | 212 | Stop for rod. |
|  |  | 208 | Start again. |
|  |  | 208 | Stop for rod. |
|  |  | 204 | End of Bead a′ on Flange 1. |
| 2 | b | 191 | Welding started between T.C. and moved toward it. |
|  |  | 191 | Stop for rod. |
|  |  | 191 | Start again. |
|  |  | 191 | Stop for rod. |
|  |  | 199 | Start again. |
|  |  | 238 | Stop for rod. |
|  |  | 251 | Start again. |
|  |  | 255 | Stop for rod. |
|  |  | 255 | Start again. |
|  |  | 255 | Stop for rod. |
|  |  | 251 | Start again. |
|  |  | 243 | End of Bead b on Flange 2. |
| 1 | b′ | 199 | Welding started between T.C. and moved toward it. |
|  |  | 199 | Stop for rod. |
|  |  | 199 | Do. |
|  |  | 195 | Do. |
|  |  | 191 | Do. |
|  |  | 203 | Start again. |
|  |  | 212 | Stop for rod. |
|  |  | 234 | Start again. |
|  |  | 243 | Stop for rod. |
|  |  | 243 | Start again. |
|  |  | 243 | End of Board b′ on Flange 1. |
| 2 | c | 100 | Welding started between T.C. and moved toward it. |
|  |  | 130 | Stop for rod. |
|  |  | 165 | Start again. |
|  |  | 173 | Do. |
|  |  | 165 | Stop for rod. |
|  |  | 165 | Start again. |
|  |  | 165 | Stop for rod. |
|  |  | 165 | Start again. |
|  |  | 182 | End of Bead c on Flange 2. Mount assembly in jig-time approx. 1/2 hour. |
| 1 | c′ | 100 | Welding started between T.C. and moved toward it. |
|  |  | 135 | Stopped for rod. |
|  |  | 180 | Start again. |
|  |  | 165 | Five rods used. |
|  |  | 195 | End of Bead c′ on Flange 1. |

These pipes were then subjected in a process to titanium tetrachloride vapor at a temperature of 800° F. for a period of 3 months. A flange was sectioned by sawing in half and examined and was found to be undamaged.

We claim:

1. A process for joining glass-lined metal conduits, said conduits having a continuous internal glass coating and flanged ends, which comprises aligning the flanges of said conduits in abutting relationship, positioning and welding a retaining sleeve around the flanged rims, said welding being conducted at a temperature such that no portion of said glass-coated surface is heated above about 400° F., thereby securing the glass-lined metal conduits together.

2. A process for joining glass-lined metal conduits, said conduits having a continuous internal glass coating and flanged ends, which comprises aligning the flanges of said conduits in abutting relationship, positioning and welding a retaining sleeve around the flanged rims, said welding being conducted at such a temperature that the initial temperature to which the glass becomes heated is about 100° F. thereby continuing welding at a temperature such that no portion of said glass-coated surface is heated above about 400° F., thereby securing the glass-lined metal conduits together.

3. A process for joining glass-lined metal conduits, said conduits having a continuous internal glass coating and flanged ends, which comprises aligning the flanges of said conduits in abutting relationship, positioning a retaining sleeve around the flanged rims and alternately welding one flanged section of the conduit and the retaining sleeve and then the other, the welding operation being conducted such that no portion of the glass-coated surface is heated above about 400° F., thereby securing the glass-lined metal conduits together.

4. A process for joining glass-lined metal conduits, said conduits having a continuous internal glass coating and flanged ends, which comprises aligning the flanges of said conduits in abutting relationship, positioning a retaining sleeve around the flanged rims and alternately welding one flanged section of the conduit and the retaining sleeve and then the other, the welding operation being conducted such that no portion of said glass-coated surface is heated above about 200° F. thereby securing the glass-lined metal conduits together.

References Cited

UNITED STATES PATENTS

| | | | |
|---|---|---|---|
| 1,302,412 | 4/1919 | Murray | 285—286 |
| 1,639,575 | 8/1927 | Robinson | 29—473.1 X |
| 2,241,517 | 5/1941 | Moise | 285—55 |
| 2,266,611 | 12/1941 | Martin. | |
| 2,372,712 | 4/1945 | Crawford | 285—55 |
| 2,412,271 | 12/1946 | Kercher | 285—55 X |
| 2,918,757 | 12/1959 | Francl | 29—473.1 X |
| 3,107,421 | 10/1963 | Turnbull | 29—458 X |
| 3,156,035 | 11/1964 | Diehl | 285—55 X |
| 3,246,973 | 4/1966 | Bange | 29—402 X |
| 3,266,820 | 8/1966 | Leborgne | 285—21 |
| 3,325,191 | 6/1967 | Yates | 29—157 X |

JOHN F. CAMPBELL, *Primary Examiner.*

R. F. DROPKIN, *Assistant Examiner.*